US011887763B2

(12) United States Patent
Cubias

(10) Patent No.: US 11,887,763 B2
(45) Date of Patent: Jan. 30, 2024

(54) DEGAUSSING A MAGNETIZED STRUCTURE

(71) Applicant: Victor M. Cubias, Fallston, MD (US)

(72) Inventor: Victor M. Cubias, Fallston, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 843 days.

(21) Appl. No.: 16/238,368

(22) Filed: Jan. 2, 2019

(65) Prior Publication Data

US 2020/0211748 A1 Jul. 2, 2020

(51) Int. Cl.

*H01F 13/00* (2006.01)
*H01H 47/00* (2006.01)
*H01F 5/00* (2006.01)
*H01F 27/36* (2006.01)

(52) U.S. Cl.

CPC ............ *H01F 13/006* (2013.01); *H01F 5/00* (2013.01); *H01F 27/366* (2020.08)

(58) Field of Classification Search

CPC ................................ H01F 13/006; H01F 5/00
USPC ......................................................... 361/149
See application file for complete search history.

(56) References Cited

U.S. PATENT DOCUMENTS 3,123,761 A * 3/1964 Greene .................... G05F 1/26 363/92
4,030,002 A 6/1977 Alexandrovich, Sr. et al.
4,153,858 A * 5/1979 Schylander .............. H04N 9/29 315/8
4,467,389 A * 8/1984 Knipp .................. G11B 5/0245 361/151
4,607,310 A 8/1986 Channel et al.
4,621,299 A 11/1986 Hill
5,198,959 A 3/1993 Scholtysik et al.
5,357,398 A 10/1994 Kamijoh
7,451,719 B1 11/2008 Fitzpatrick et al.
2003/0137793 A1 7/2003 Libera
(Continued)

FOREIGN PATENT DOCUMENTS

EP 1324369 A2 7/2003
EP 1791138 A1 5/2007
JP S56167307 A 12/1981
(Continued)

OTHER PUBLICATIONS

International Search Report for International Application No. PCT/US2019/064489 dated Mar. 5, 2020.
(Continued)

*Primary Examiner* — Jared Fureman
*Assistant Examiner* — Lucy M Thomas
(74) *Attorney, Agent, or Firm* — Tarolli, Sundheim, Covell & Tummino LLP

(57) ABSTRACT

A system for degaussing a magnetized structure can include a given circuit that provides a differential alternating current (AC) signal that decays from an upper level to a lower level over a predetermined amount of time. The system also includes a given electrical coil coupled to the given circuit. The electrical coil circumscribes the magnetized structure. The electrical coil induces a decaying magnetic field on the magnetized structure in response to the differential AC signal to convert the magnetized structure into a degaussed structure.

20 Claims, 7 Drawing Sheets

(56) References Cited

U.S. PATENT DOCUMENTS

| | | | |
|---|---|---|---|
| 2006/0127314 | A1 | 6/2006 | Ardenkjaer-Larsen et al. |
| 2011/0237442 | A1 | 9/2011 | Uchaykin |

FOREIGN PATENT DOCUMENTS

| | | | |
|---|---|---|---|
| JP | U11991020407 | | 2/1991 |
| JP | 2008288328 | A | 11/2008 |
| JP | 2015053483 | A | 3/2015 |

OTHER PUBLICATIONS

Office Action dated Jul. 11, 2023 for corresponding CA Patent Application No. 3,123,138.
Office Action dated Jul. 26, 2022 for corresponding JP 2021-535953.
Office Action dated Jul. 14, 2022 for corresponding KR 10-2021-7023869.

* cited by examiner

DEGAUSSING A MAGNETIZED STRUCTURE

TECHNICAL FIELD

The present disclosure relates to magnetization. More particularly, this disclosure is related to systems and methods for degaussing a magnetized structure.

BACKGROUND

Magnetic hysteresis occurs when an external magnetic field is applied to a ferromagnet such as iron and the atomic dipoles align themselves with the magnetic field. Even when the field is removed, part of the alignment will be retained, such that the material has become magnetized. Once magnetized, the magnet will stay magnetized indefinitely.

More particularly, remanence, which is also referred to as remanent magnetization, residual magnetism and/or a remanent magnetic field is the magnetization left behind in a ferromagnetic material (such as iron) after an external magnetic field is removed. The remanence also refers to the measure of that magnetization. Colloquially, when a magnet is "magnetized", the magnet has remanence. The remanence of magnetic materials provides the magnetic memory in magnetic storage devices, and is used as a source of information on the past Earth's magnetic field in paleomagnetism.

Degaussing is the process of decreasing or eliminating a remnant magnetic field. Degaussing was originally applied to reduce a ship's magnetic signature. Degaussing is also used to reduce magnetic fields in cathode ray tube monitors and to destroy data held on magnetic storage.

SUMMARY

One example relates to a system for degaussing a magnetized structure. The system can include a given circuit that provides a differential alternating current (AC) signal that decays from an upper level to a lower level over a predetermined amount of time. The system can also include a given electrical coil coupled to the given circuit. The electrical coil circumscribes the magnetized structure. The electrical coil can induce a decaying magnetic field on the magnetized structure in response to the differential AC signal to convert the magnetized structure into a degaussed structure.

Another example relates to a system for degaussing a magnetized structure. The system can include an AC waveform generator that provides an AC waveform that decays from an upper level to a lower level over a predetermined amount of time. The system can also include an amplifier that converts the AC waveform into a differential AC signal and amplifies the differential AC signal. The system can further include a given electrical coil coupled to the given circuit. The given electrical coil circumscribes the magnetized structure. Additionally, the system can include a direct current (DC) waveform generator that provides a DC signal that remains nearly constant over the predetermined amount of time. The system can yet further include another electrical coil positioned in a cavity of the magnetized structure. The system still further includes a shielded gauss chamber that encapsulates the given electrical coil, the other electrical coil and magnetized structure, wherein the shielded gauss chamber prevents magnetic fields from penetrating the magnetized structure. The given electrical coil can induce a decaying magnetic field on the magnetized structure in response to the amplified differential AC signal and the other electrical coil can induce a nearly constant magnetic field on the magnetized structure to convert the magnetized structure into a degaussed structure with a DC offset magnetic field.

Yet another example relates to a method for degaussing a magnetized structure. The method can include generating, at a given circuit, a differential alternating current (AC) signal that decays from an upper level to a lower level over a predetermined amount of time. The method can also include inducing, by a given electrical coil that is coupled to the given circuit and that circumscribes the given magnetic structure, a decaying magnetic field on the magnetized structure in response to the differential AC signal to convert the magnetized structure into a degaussed structure.

DETAILED DESCRIPTION

This disclosure relates to systems and methods for degaussing a magnetized structure. The magnetized structure can be situated (positioned) in an interior of a first electrical coil coupled to a first circuit, such that the electrical coil circumscribes the magnetized structure. Moreover, in some examples, a shielded gauss chamber can encapsulate the electrical coil and the magnetized structure to prevent stray magnetic fields from penetrating the magnetized structure. In some examples, the first circuit has an alternating current (AC) waveform generator that provides a single ended AC waveform that decays from an upper level to a lower level over a predetermined amount of time. The first circuit can also have an amplifier that converts the AC waveform into a differential AC signal and amplifies the differential AC signal.

In response to the (amplified) differential AC signal, the first electrical coil induces a decaying magnetic field on the magnetized structure. The decaying magnetic field curtails a remanent magnetic field of the magnetized structure, thereby converting the magnetized structure into a degaussed structure.

In some examples, the system can include a second circuit that has a direct current (DC) waveform generator that provides a DC signal that remains nearly constant over another predetermined amount of time to a second electrical coil positioned in a cavity of the magnetized structure. In response to the DC signal, the second electrical coil induces a nearly static magnetic field that is applied to the degaussed structure to induce a remanent magnetic field (an offset magnetic field) that is opposite (or nearly opposite) of the earth's magnetic field.

By employing the systems and methods described herein, the magnetized structure can be degaussed with a relatively simple and inexpensive process. In this manner, in situations where the remanent magnetic field of the magnetized structure would interfere with operations of another circuit (or other component), the remanent magnetic field can be curtailed to avoid such interference.

Figure 1:
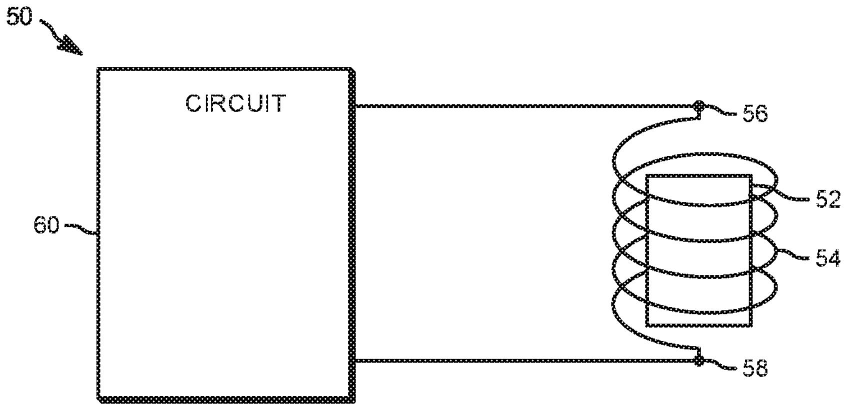
FIG. 1 illustrates an example of a system for degaussing a magnetized structure.

FIG. 1 illustrates a block diagram of a system 50 for degaussing a magnetized structure 52. As used herein, the term "magnetized structure" refers to a structure that has a remanent magnetization from a previous exposure to a magnetic field. In some examples, the remanent magnetization can have a magnetic flux density of about 0.1 teslas (T) or more. The magnetized structure 52 can be formed of nearly any material that can be magnetized, such as iron, copper, nickel, cobalt, ceramic, plastic, steel and/or any combination thereof. More particularly in some examples, the magnetized structure 52 can be a material that is selected to generally resist magnetization, such as ceramic, plastic and/or steel. In fact, in some examples, the magnetized structure 52 can be a magnetic shield that can house another device, such as a superconductor and shield the other device from stray magnetic fields.

The magnetized structure 52 can be circumscribed by an electrical coil 54. The magnetized structure 52 can be situated within an interior portion of the electrical coil 54. The electrical coil 54 can be implemented as an air-core inductor (e.g., a hollow inductor), such as a solenoid. A first node 56 and a second node 58 of the electrical coil can be coupled to a circuit 60. The circuit 60 can provide a differential alternating current (AC) signal to the first node 56 and the second node 58 of the electrical coil 54 to energize the electrical coil 54.

The AC differential signal provided from the circuit 60 can be a decaying AC signal that decays from an upper threshold voltage to a lower threshold voltage over a period of time. The upper threshold voltage can vary based on the material of the magnetized structure 52 and/or an initial magnetic flux density of the magnetized structure 52. The AC signal applied to the first node 56 and the second node 58 has a sufficient magnitude to induce a magnetic field that is larger than the saturation point of the magnetized structure 52. This saturation point can vary based on physical properties of the magnetized structure 52, such as but not limited to geometry, size, weight or some combination thereof. In some examples, the upper threshold voltage can be about 50 Volts (V) to about 70 V. Additionally, the lower threshold voltage can be about 0 V. Moreover, the period of time of the decay can be about 45 seconds or more. The differential AC signal can have a nearly constant frequency selected from a range of DC (0 Hertz) to about 100 Hertz (Hz), including a sub-range of about 40 Hz to about 100 Hz. It is understood that the example values provided are not limiting. That is, in other examples, AC signals with other voltage levels, currents, frequencies, delays, etc. could be employed to degauss the magnetized structure 52.

The decay of the differential AC signal can occur at a relatively linear rate or an exponential rate over the period of time. In either example, however, the decay is continuous. That is, the decay, whether a linear rate or an exponential rate occurs with zero (0) or nearly zero (0) discontinuities throughout the period of time.

Application of the decaying differential AC signal causes the electrical coil to induce corresponding decaying magnetic field on the magnetized structure 52. Thus, the magnetic field induced on the magnetized structure 52 decays from an upper level magnetic flux density to a lower level magnetic flux density over the period of time. The upper level magnetic flux density and the lower level flux density can vary based on the physical properties of the electrical coil 54 (e.g., the number of turns and/or the frequency of the turns). As the magnetic field induced by the electrical coil 54 coil decays, the magnetic flux density of the remanent magnetization of the magnetized structure 52 decays as well over the period of time. That is, the magnetized structure is degaussed. In some examples, after the period of time, the remanent magnetization of the magnetized structure 52 can be about 25 nanoteslas (nT) or less, such as less than 9 nT. By curtailing the remnant magnetic field of the magnetized structure 52 in this manner, the magnetized structure 52 is converted into a degaussed structured 52.

By employing the system 50, the magnetized structure 52 can be degaussed with a relatively simple and inexpensive process. In this manner, in situations where the remanent magnetic field of the magnetized structure 52 would interfere with operations of another circuit (or other component), the remanent magnetic field can be curtailed to avoid such interference. Moreover, the system 50 can degauss the magnetized structure 52 without application of a heat (e.g., through an annealing process) or other complicated and/or expensive process.

Figure 2:
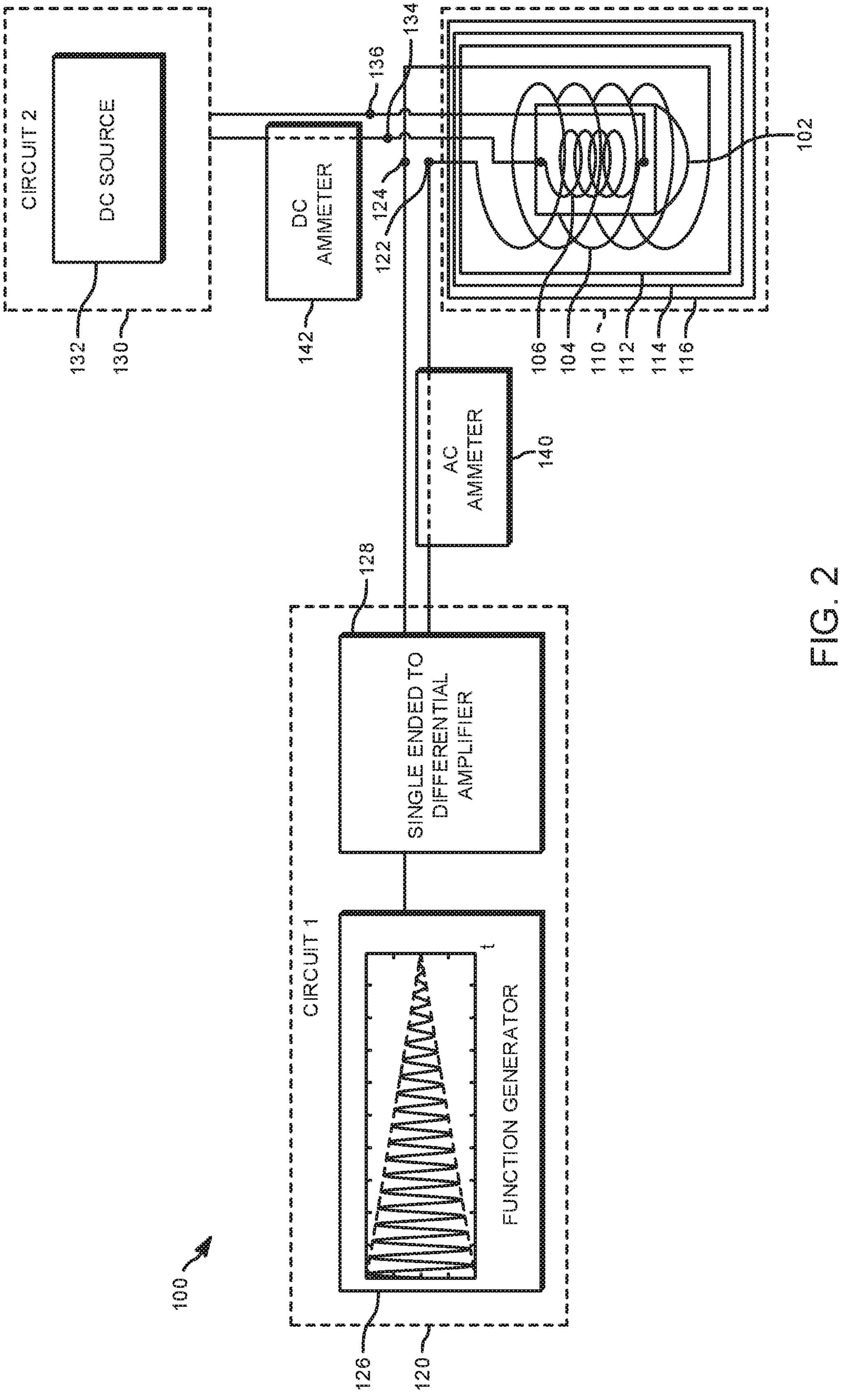
FIG. 2 illustrates another example of a system for degaussing a magnetized structure.

FIG. 2 illustrates another example of a system 100 for degaussing a magnetized structure 102. The magnetized structure 102 can be employed to implement the magnetized structure 52 of FIG. 1. The magnetized structure 102 can be formed of any material that can carry a remnant magnetic field. In a given example (hereinafter, "the given example"), the magnetized structure 102 is a shielded gauss chamber (e.g., a magnetic shield) that can house a superconductor. However, in other examples, the magnetized structure 102 can be employed for other purposes.

Continuing with the given example, the magnetized structure 102 includes a hollow cylindrical tube portion and a hemispherical end. Stated differently, the magnetized structure 102 can be implemented with a hollow elongated tube with a round endcap. The magnetized structure 102 also includes a cavity that, in the given example, may intermittently house a superconducting circuit. Continuing with the given example, the magnetized structure 102 may have become magnetized through repeated exposure to operating the superconducting circuit. That is, the magnetized structure 102 has a remanent magnetic field. Due to the sensitivity of such superconducting circuits, the remanent magnetic field of the magnetized structure 102 can interfere with proper operation of the superconducting circuit. Thus, it may be desirable to curtail the remanent magnetic field of the magnetized structure 102 to a magnetic flux density of to less than about 100 nanoteslas (nT). To curtail the remanent magnetic field of the magnetized structure 102, the system 100 can execute a degaussing process, in a manner explained herein.

An outside of the magnetized structure 102 is circumscribed by a first electrical coil 104. The first electrical coil 104 can be employed to implement the electrical coil 54 of FIG. 1. Additionally, a second electrical coil 106 can be situated in the (internal) cavity of the magnetized structure 102. Stated differently, in some examples, the magnetized structure 102 is positioned within the first electrical coil 104, and the second electrical coil 106 is positioned in the cavity of the magnetized structure 102.

The system 100 can include a shielded gauss chamber 110 for housing the first electrical coil 104, the second electrical coil 106 and the magnetized structure 102. The shielded gauss chamber 110 prevents stray magnetic fields from penetrating the magnetized structure 102 during the degaussing process.

The shielded gauss chamber 110 can have shield layers. In the example illustrated, there are three (3) such shield layers, but in other examples, there could be more or less shield layers. In the example illustrated, the shielded gauss chamber 110 includes an inner shield layer 112, a middle shield layer 114 and an outer shield layer 116. The inner shield layer 112 can be a shielded gauss chamber that encapsulates the first electrical coil 104, the second electrical coil 106 and the magnetized structure 102. The middle shield layer 114 can be a shielded gauss chamber that encapsulates the inner shield layer 112. The outer shield layer 116 can be a shielded gauss chamber that encapsulates the middle shield layer 114. Accordingly, the shielded gauss chamber 110 can provide multiple layers of shielding from the stray magnetic fields.

The system 100 includes a first circuit (labeled "CIRCUIT 1") 120 that can generate a differential AC signal that is applied to a first node 122 and a second node 124 of the first electrical coil 104. The differential AC signal has sufficient power to energize the first electrical coil 104. Additionally, the AC signal applied to the first node 122 and the second node 124 has a sufficient magnitude to induce a magnetic field that is larger than the saturation point of the magnetized structure 102. This saturation point can vary based on physical properties of the magnetized structure 102, such as but not limited to geometry, size, weight or some combination thereof. The first circuit 120 includes a function generator 126 that can generate a single ended AC signal with a decaying waveform. The singled ended AC signal decays at a nearly continuous rate (e.g., a linear rate or an exponential rate) from an upper threshold (e.g., about 50 V to about 90 V) to a lower threshold (e.g., about 0 V) over a period of time (e.g., about 45 or more seconds) at a frequency of DC to about 100 Hz, such as within a sub-range of about 40 Hz to about 100 Hz. Thus, the single end AC signal decays with no or nearly no discontinuities. The function generator 126 can provide the single ended AC signal to a single ended to differential amplifier 128 that can convert the single ended AC signal into a low power differential AC signal and amplify the low power differential signal to produce the differential AC signal that drives the first electrical coil 104. It is understood that the example values provided are not limiting. That is, in other examples, AC signals with other voltage levels, currents, frequencies, delays, etc. could be employed to degauss the magnetized structure 102.

Additionally, the second electrical coil 106 receives a direct current (DC) signal from a second circuit 130 (labeled "CIRCUIT 2") that includes a DC source 132 (e.g., a DC power source) that provides a nearly constant current source. The second electrical coil 106 can be coupled to the DC source 132 at a first node 134 and a second node 136. The DC signal is nearly constant, and has sufficient power to energize the second electrical coil 106. In some examples, the DC signal can have a nearly constant current of about 3 milliamps to about 50 milliamps. As an alternative, the second circuit 130 can include a DC voltage source that could apply a nearly constant voltage within a range from about 5 V to about 20 V.

In some examples, an AC ammeter 140 can be coupled to the first node 122 of the first electrical coil to measure a current of the decaying differential AC signal traversing the first electrical coil 104. Similarly, a DC ammeter 142 can be coupled to the first node 134 of the second electrical coil 106 to measure a current of the nearly constant DC signal traversing the second electrical coil 106.

Application of the differential AC signal from the first circuit 120 causes the first electrical coil 104 to induce a decaying magnetic field that decays at nearly the same rate as the differential AC signal. The decaying magnetic field induced by the first electrical coil 104 curtails the remanent magnetic field of the magnetized structure 102. The remanent magnetic field of the magnetized structure 102 can be curtailed to to a level of about 25 nT or less, such as less than 9 nT to convert the magnetized structure 102 into a degaussed structure 102.

Figure 3:
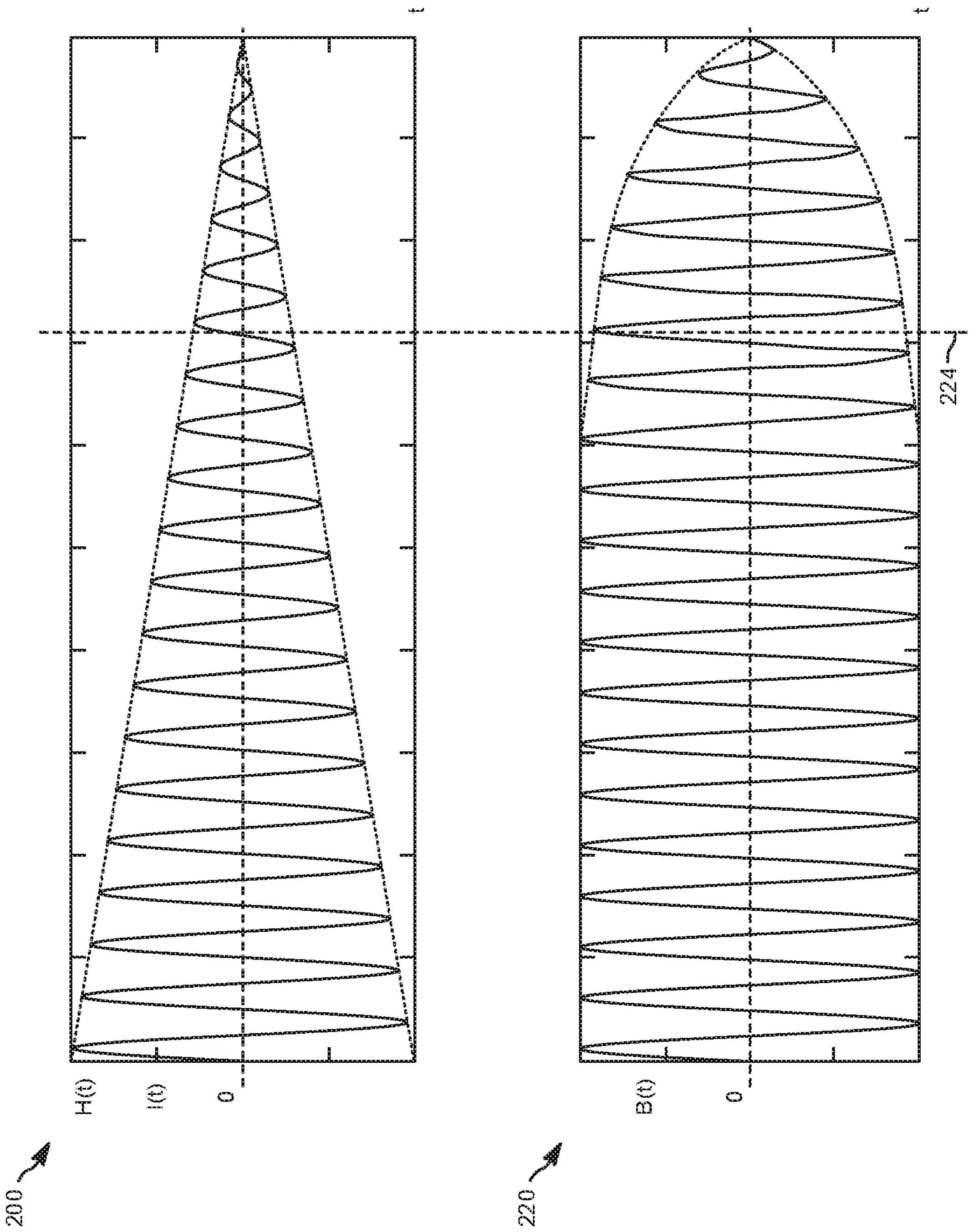
FIG. 3. illustrates an example of graphs of a current, a magnetic field strength and a resultant magnetic flux density plotted as a function of time.

FIG. 3 illustrates exaggerated graphs 200 and 220 of a measured current, I(t), a measured magnetic field strength, H(t) and a resultant magnetic flux density, B(t) each as a function of time. For purposes of simplification of explanation, the frequency, amplitudes, and time period of the signals plotted in graphs 200 and 220 is exaggerated.

The graph 200 plots a measured current I(t) (in milliamps) and a measured magnetic field strength, H(t) (amperes per meter), as a function of time over a given period of time, that could be induced by the first electrical coil 104 and applied to the magnetized structure 102. As illustrated by the graph 200, as current, I(t) decays, the magnetic field strength, H(t) also decays at nearly the same rate. Additionally, graph 220 plots a resultant (responsive) magnetic flux density, B(t) in nanoteslas (nT) of the magnetized structure 102 on the given period of time. At a saturation point 224, the magnetic flux density, B(t) decreases at an exponential rate as the magnetic field strength (of the induced magnetic field) decays linearly. Thus, as illustrated by the graphs 200 and 224, induction of the linearly decaying magnetic field reduces the resultant magnetic flux density of the magnetized structure 102 to convert the magnetized structure 102 into the degaussed structure 102.

Referring back to FIG. 2, upon converting the magnetized structure 102 into the degaussed structure 102, the DC source 132 can apply the DC signal to the second electrical coil 130, which in turn causes the second electrical coil 130 to induce a nearly constant magnetic field (e.g., a static magnetic field) in the cavity of the magnetized structure. Further, the nearly constant magnetic field induced by the second electrical coil 106 induces a remanent magnetic field in the degaussed structure 120, which remanent magnetic field can be referred to as an offset magnetic field. The offset magnetic field can have a polarity (direction) that is nearly opposite of the earth's magnetic field, and a strength (magnitude) that is nearly equal to the strength of the earth's magnetic field. That is, the offset magnetic field of the degaussed structure 102 offsets the earth's magnetic field.

Figure 4:
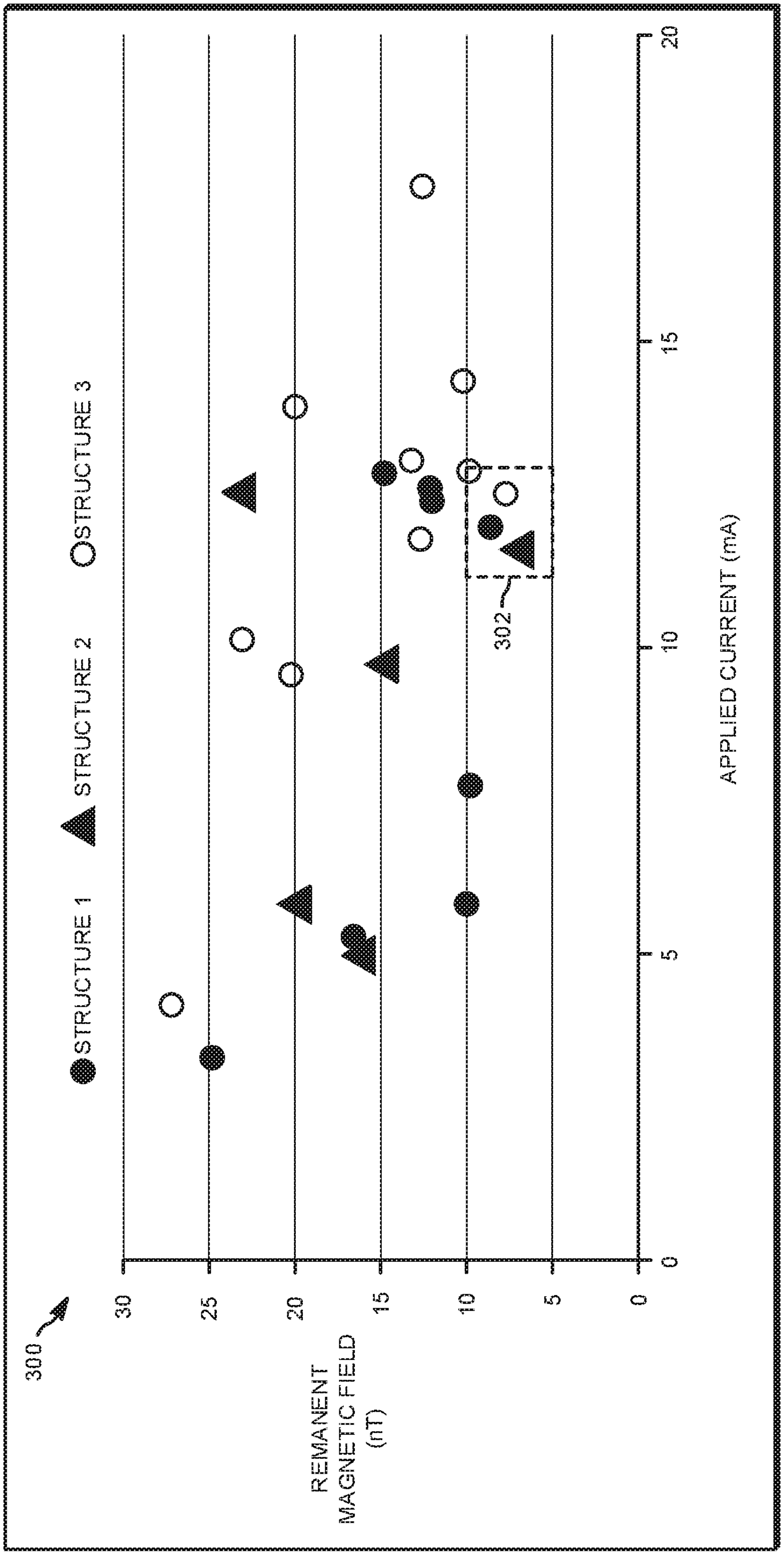
FIG. 4 illustrates a chart that plots a remanent magnetic field as a function of applied current.

FIG. 4 illustrates an example graph 300 that plots a measured remanent magnetic field in a degaussed structure (e.g., the degaussed structure 102 of FIG. 1) as a function of a current amplitude of an exponentially decaying AC differential signal for three (3) different degaussed structures by employing a system similar to the system 100 of FIG. 2. As is illustrated by the dashed box 302, each of the three degaussed structures has a remanent magnetic field of less than 10 nT a current of about 12 to about 13 mA.

Referring back to FIG. 2, by employing the system 100, the magnetized structure 102 can be degaussed with a relatively simple and inexpensive process. In this manner, in situations where the remanent magnetic field of the magnetized structure 102 would interfere with operations of another circuit (or other component), the remanent magnetic field can be curtailed to avoid such interference. Moreover, the system 100 can degauss the magnetized structure 102 without application of a heat (e.g., through an annealing process).

Further still, application of the nearly static magnetic field by the second electrical coil 106 can induce the offset magnetic field (a remanent magnetic field) on the degaussed structure 102 to offset the earth's magnetic field. The offset magnetic field causes a net magnetic field to be near 0 T, which net magnetic field can be lower than a non-magnetized structure (e.g., a newly formed structure).

Figure 5:
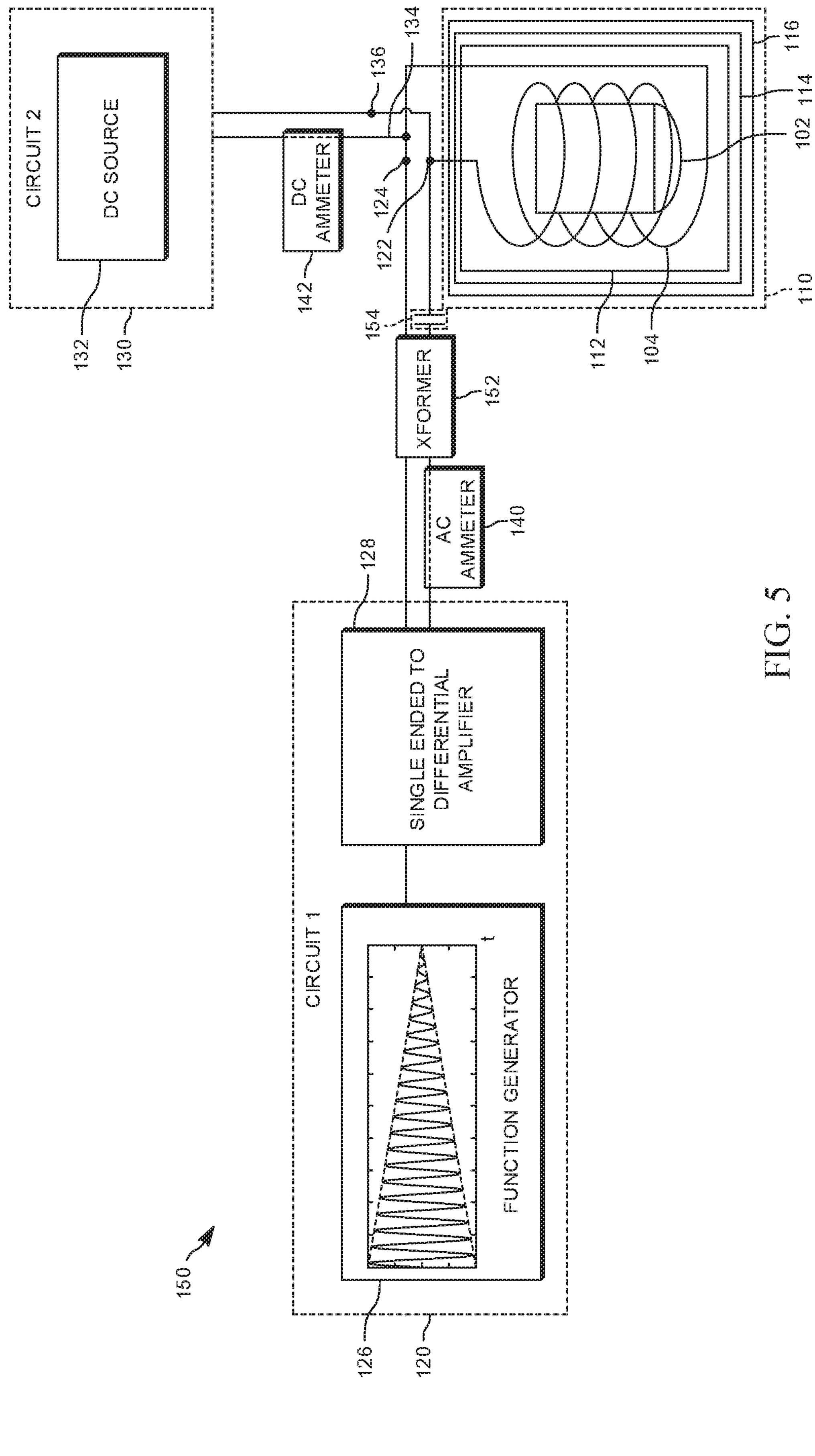
FIG. 5 illustrates yet another example of a system for degaussing a magnetized structure.

It is understood that there are other configurations for inducing the offset magnetic field described with respect to FIG. 2. FIG. 5 illustrates one such possible alternate configuration. More particularly, FIG. 5 illustrates a system 150 that is similar to the system 100 of FIG. 2. Thus, the same reference numbers are employed in FIGS. 2 and 5 to denote the same structure.

The system 150 includes a transformer 152 coupled between the single ended to differential amplifier 128 of the first circuit 120 and the first node 122 and the second node 124 of the first electrical coil 104. Additionally, a DC blocking capacitor 154 is coupled between the first node 122 and the transformer 152. Further, the DC source 132 is coupled to the first node 122 and the second node 124 of the first electrical coil (and the second electrical coil 106 of FIG. 2 is omitted). By arranging the system 150 in this manner, a DC offset is applied to the signal from the first circuit 120.

Figure 6:
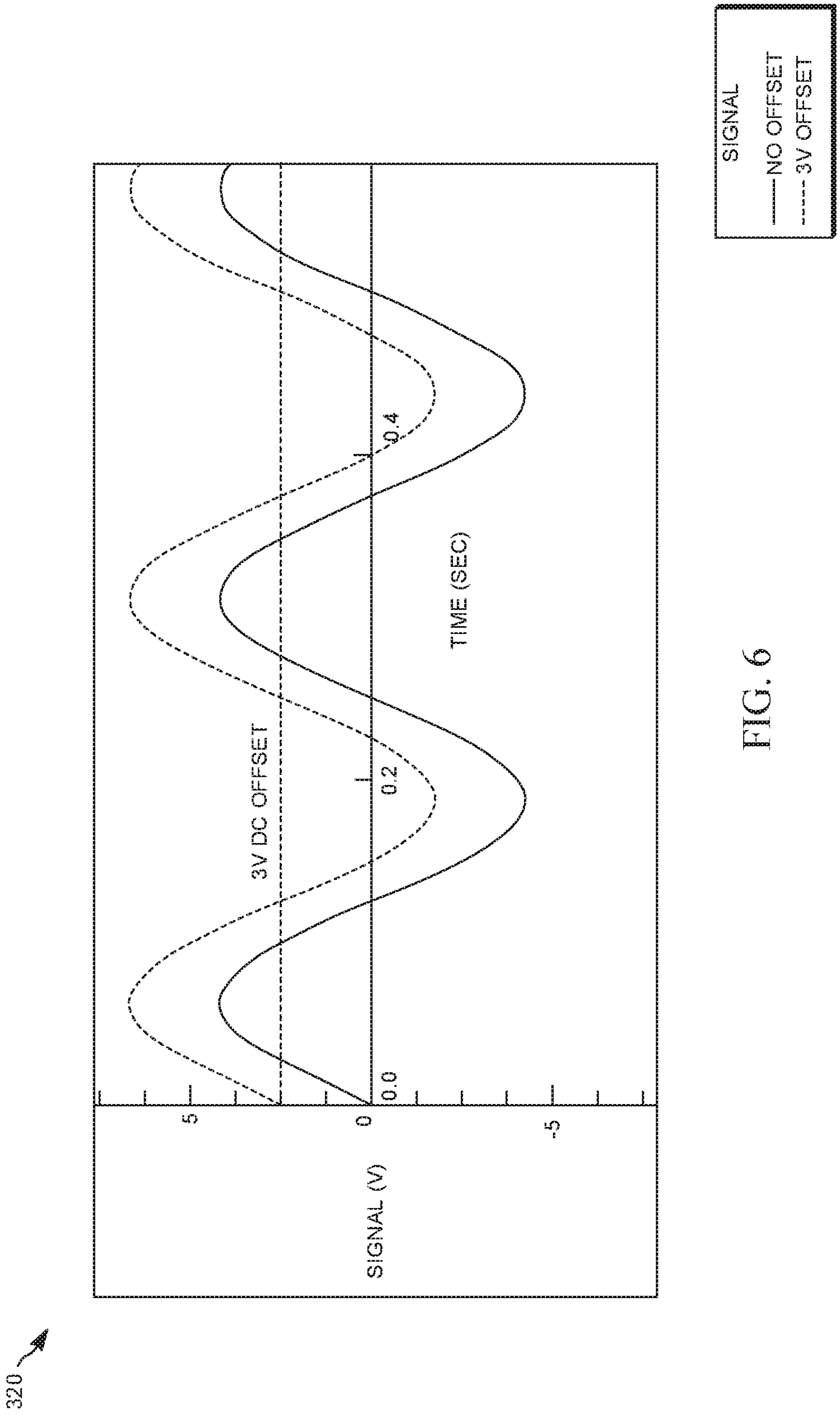
FIG. 6 illustrates a graph that plots a voltage signals applied to an electrical coil as a function of time.

FIG. 6 illustrates a graph 320 that plots an AC signal applied to the first electrical coil 104 of FIG. 5 as a function of time both with a DC offset of 3V applied and without the DC offset applied. As is illustrated by the graph 320, the DC offset directly impacts the AC signal.

Referring back to FIG. 5, application of the DC offset to the first electrical coil 104 provides nearly the same offset magnetic field as is described with respect to FIG. 2. Moreover, it is understood that there are many other ways to induce the offset magnetic field through application of a DC offset signal, and FIGS. 2 and 5 simply illustrate two (2) such possible configurations.

Figure 7:
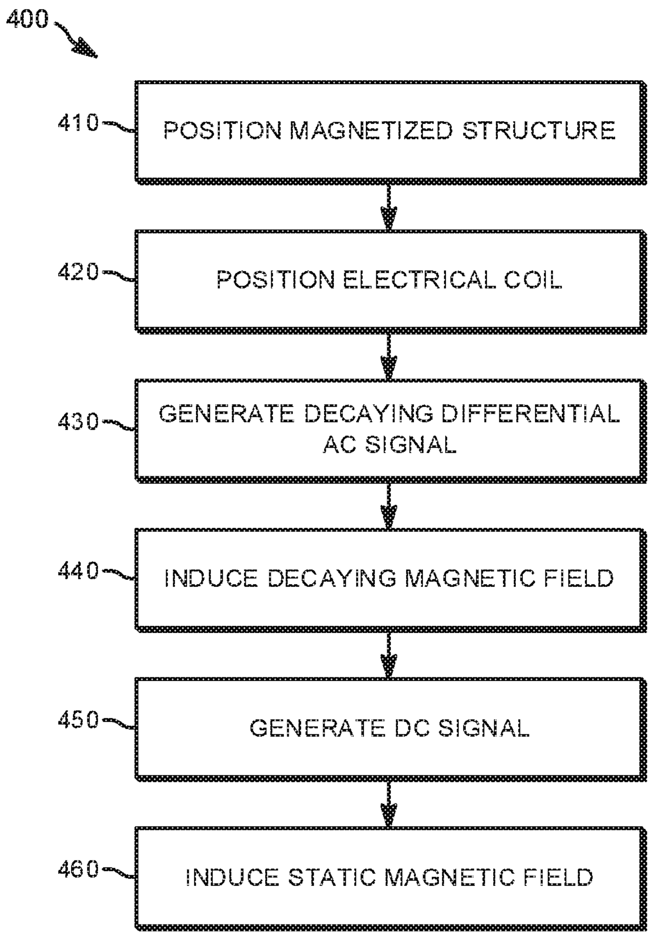
FIG. 7 illustrates a flowchart of an example method for degaussing a magnetized structure.

In view of the foregoing structural and functional features described above, example methods will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 7 illustrates a flowchart of an example method 400 for curtailing a remnant magnetic field of a magnetized structure. The method 400 could be implemented, for example, by the system 100 of FIG. 2. At 410, the magnetized structure (e.g., the magnetized structure 102 of FIG. 2) can be positioned within an interior of a first electrical coil (e.g., the first electrical coil 104 of FIG. 2). At 420, a second electrical coil (e.g., the second electrical coil 106 of FIG. 2) can be positioned in an interior of the magnetized structure.

At 430, a first circuit (e.g., the first circuit 120 of FIG. 2) can generate a decaying differential AC signal. At 440, in response to the decaying differential AC signal, the first coil induces a decaying magnetic field on the magnetized structure, which converts the magnetized structure into a degaussed structure.

At 450, a second circuit (e.g., the second circuit 130 of FIG. 2) generates a DC signal. At 460, in response to the DC signal, the second electrical coil induces a nearly static magnetic field on the degaussed structure to induce an offset remnant magnetic field in the degaussed structure.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for degaussing a magnetized structure, the system comprising:

a first circuit that provides an alternating current (AC) signal that decays from an upper level to a lower level over a predetermined amount of time;

a first electrical coil coupled to the first circuit, wherein the first electrical coil circumscribes the magnetized structure, wherein the first electrical coil induces a decaying magnetic field on the magnetized structure in response to the AC signal to convert the magnetized structure into a degaussed structure; and a second electrical coil that is positioned in an interior portion of the magnetized structure, wherein a direct current (DC) signal is provided to the second electrical coil to induce an offset magnetic field on the degaussed structure.

2. The system of claim 1, further comprising:

a shielded gauss chamber that encapsulates the first electrical coil and the magnetized structure, wherein the shielded gauss chamber prevents stray magnetic fields from penetrating the magnetized structure.

3. The system of claim 2, wherein the shielded gauss chamber further comprises:

an inner shielded gauss chamber that encapsulates the first electrical coil and the magnetized structure;

a middle-shielded gauss chamber that encapsulates the inner shielded gauss chamber; and an outer shielded gauss chamber that encapsulates the middle-shielded gauss chamber.

4. The system of claim 2, wherein the magnetized structure comprises a cylindrical tube with a hemispherical end, the system further comprising:

a second circuit that provides the direct current (DC) signal that is nearly constant over the predetermined amount of time to induce an offset magnetic field in the degaussed structure.

5. The system of claim 4, wherein the second circuit induces a nearly constant magnetic field on the magnetized structure in response to the DC signal to induce the offset magnetic field in the degaussed structure.

6. The system of claim 4, further comprising:

a transformer coupled between the first circuit and the first electrical coil; and a DC blocking capacitor coupled between the transformer and the first electrical coil, wherein the second circuit provides the DC signal to the first electrical coil to induce the offset magnetic field in the degaussed structure.

7. The system of claim 1, wherein the degaussed structure has a magnetic flux density of less than 10 nanoteslas.

8. The system of claim 1, wherein the first circuit comprises:

an amplifier that converts the AC signal into a low power AC signal and amplifies the low power AC signal to form the AC signal provided to the first electrical coil, wherein AC signal provided to the first electrical coil has a sufficient magnitude to induce a magnetic field that is larger than the saturation point of the magnetized structure.

9. The system of claim 1, wherein the predetermined amount of time is about 45 seconds or more.

10. The system of claim 9, wherein a rate of the decay of the AC signal is substantially linear.

11. The system of claim 1, wherein the magnetized structure is a shielded gauss chamber for housing a superconducting circuit.

12. The system of claim 1, wherein the AC signal has a nearly constant frequency selected from a range of about 40 to 100 Hertz.

13. A system for degaussing a magnetized structure, the system comprising:

an alternating current (AC) waveform generator that provides an AC waveform that decays from an upper level to a lower level over a predetermined amount of time;

an amplifier that converts the AC waveform into a AC signal and amplifies the AC signal;

a first electrical coil coupled to a first circuit, wherein the first electrical coil circumscribes the magnetized structure;

a direct current (DC) waveform generator that provides a DC signal that remains nearly constant over the predetermined amount of time;

a second electrical coil positioned in a chamber of the magnetized structure, wherein the second electrical coil receives the DC signal provided by the DC waveform generator; and a shielded gauss chamber that encapsulates the first electrical coil, the second electrical coil and the magnetized structure, wherein the shielded gauss chamber prevents magnetic fields from penetrating the magnetized structure;

wherein the first electrical coil induces a decaying magnetic field on the magnetized structure in response to the amplified AC signal and the second electrical coil induces a nearly constant magnetic field on the magnetized structure to convert the magnetized structure into a degaussed structure with an offset magnetic field.

14. The system of claim 13, wherein the shielded gauss chamber further comprises:

an inner shielded gauss chamber that encapsulates the first electrical coil and the magnetized structure;

a middle-shielded gauss chamber that encapsulates the inner shielded gauss chamber; and an outer shielded gauss chamber that encapsulates the middle-shielded gauss chamber.

15. The system of claim 13, wherein the predetermined amount of time is about 45 seconds or more.

16. The system of claim 13, wherein a rate of the decay is substantially linear.

17. A method for degaussing a magnetized structure, the method comprising:

generating, at a first circuit, a alternating current (AC) signal that decays from an upper level to a lower level over a predetermined amount of time;

inducing, by a first electrical coil that is coupled to the first circuit and that circumscribes a magnetized structure, a decaying magnetic field on the magnetized structure in response to the AC signal to convert the magnetized structure into a degaussed structure; and inducing, by a second electrical coil that is positioned in an interior portion of the magnetized structure, an offset magnetic field on the degaussed structure in response to the second electrical coil receiving a direct current (DC).

18. The method of claim 17, wherein a rate of the decay of the AC signal is substantially linear.

19. The method of claim 17, further comprising:

generating, at second circuit, a direct current (DC) signal that remains nearly constant over the predetermined amount of time; and inducing by a second electrical coil coupled to the second circuit, a nearly static magnetic field on the degaussed structure in response to the DC signal, to induce an offset magnetic field in the degaussed structure.

20. The method of claim 17, wherein the predetermined amount of time is about 45 seconds or more.

* * * * *